UNITED STATES PATENT OFFICE.

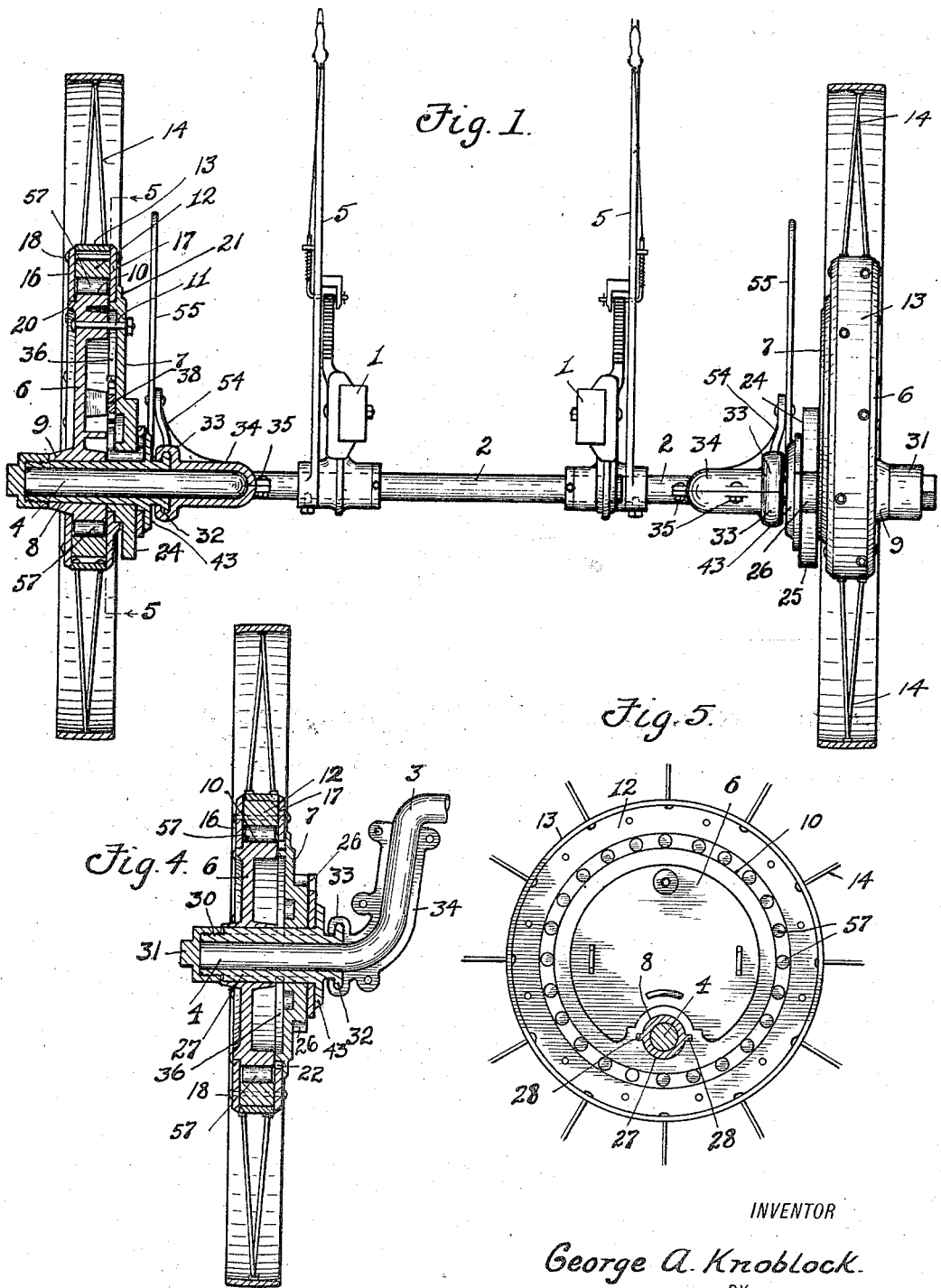

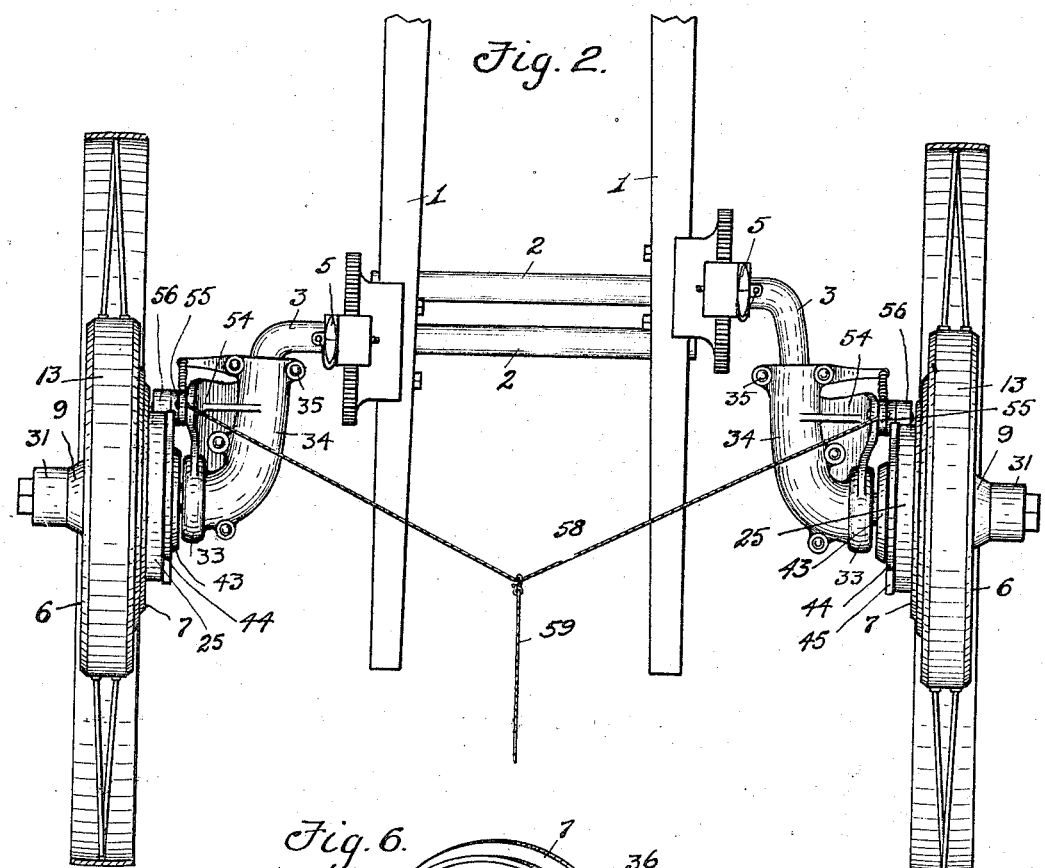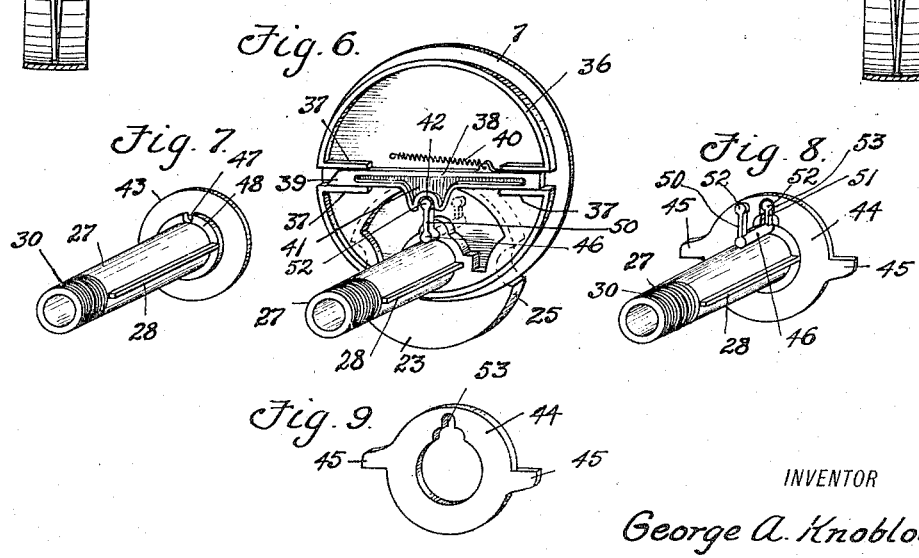

GEORGE A. KNOBLOCK, OF SOUTH BEND, INDIANA.

POWER-LIFT FOR PLOWS.

1,192,074.                    Specification of Letters Patent.      Patented July 25, 1916.

Application filed March 15, 1916. Serial No. 84,273.

*To all whom it may concern:*

Be it known that I, GEORGE A. KNOBLOCK, a citizen of the United States, residing at South Bend, in the county of St. Joseph and State of Indiana, have invented certain new and useful Improvements in Power-Lifts for Plows, of which the following is a specification.

The invention is directed to a power lift designed particularly for use with plows, while structurally adapted for utilization as a power lift for other purposes.

The invention, in the specific application illustrated and described, is designed to provide a means whereby the power of the ground wheel or wheels may, at the will of the operator, be used to raise or lower the plow beams, the construction being arranged to entirely avoid interference with the usual manually operated beam lift.

In the specific adaptation hereinafter described, the invention contemplates the provision of a hub for the ground wheel or wheels, which hub is mounted for independent movement within the hub ring forming a fixed part of the wheel, manually governed means being arranged whereby at will the hub may be locked with relation to the hub ring to compel the simultaneous rotation of the hub and wheel, automatically controlled means releasing the lock connection between the hub and hub ring under predetermined positions of the parts, the axle so called being eccentrically mounted in the hub and of crank formation, and connected to the plow beam, whereby the movement of the hub when locked to the wheel will bodily move the axle, and therewith the plow beam from one position to another.

Figure 3:
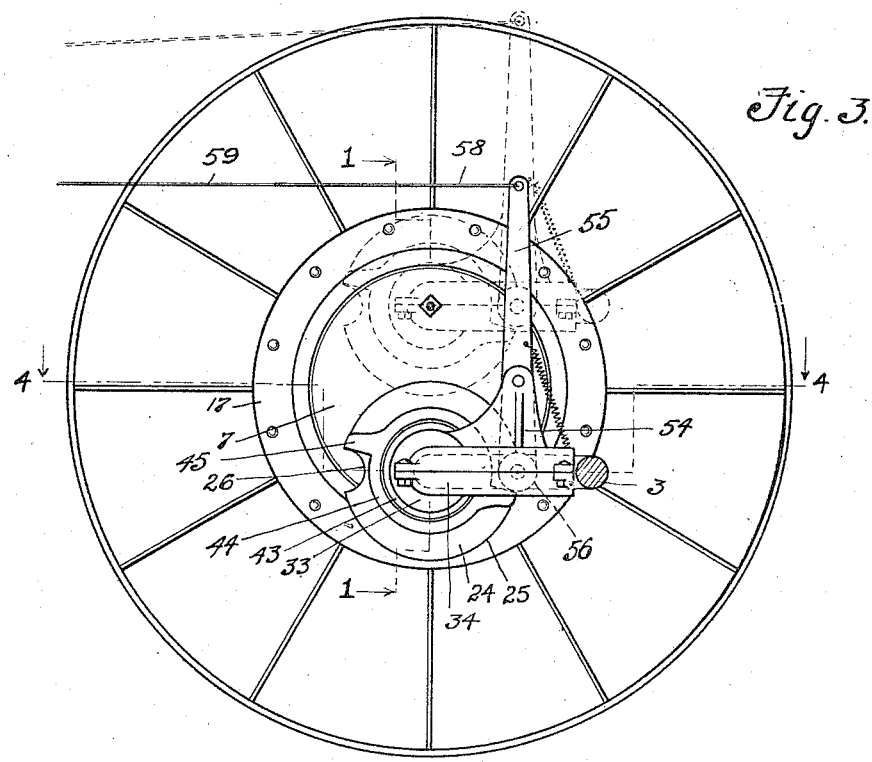
Figure 10:
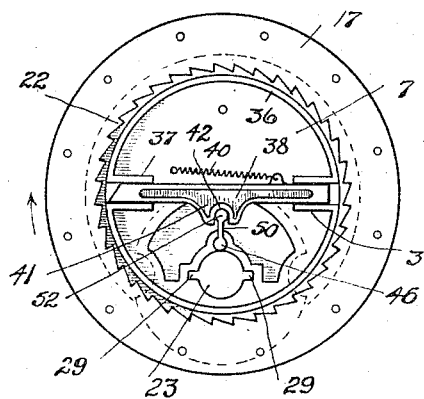
Figure 11:
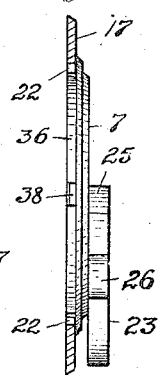
Figure 12:
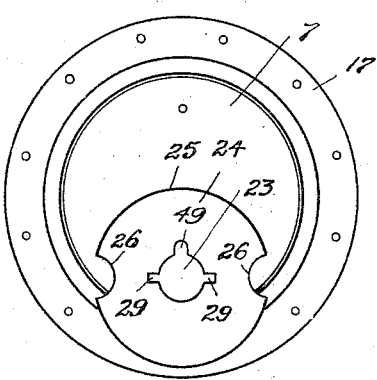

The invention in the preferred form of details will be described in the following specification, reference being had to the accompanying drawings, in which:

Figure 1 is a view in elevation illustrating sufficient of the plowing implement to indicate the application of the invention, the clutch connections and control being shown in one wheel in section approximately on the line 1—1 of Fig. 3. Fig. 2 is a top plan view of the same partly in section; Fig. 3 is a side elevation of one wheel, the respectively opposite positions of the parts being shown in full, and in dotted lines. Fig. 4 is a horizontal section on the line 4—4 of Fig. 3. Fig. 5 is a broken section taken on the line 5—5 of Fig. 1. Fig. 6 is a perspective detail illustrating particularly the arrangement of the locking bolt. Fig. 7 is a perspective view of the boxing of the axle. Fig. 8 is a similar view showing the application of the trip member and operating dog for the locking bolt. Fig. 9 is a perspective view of the trip member. Fig. 10 is a view in elevation of the clutch member with the outer casing plate removed and the boxing and axle omitted. Fig. 11 is an edge view of the same. Fig. 12 is an elevation from the inner side of the clutch mechanism, tripping member, axle and boxing being omitted.

The present invention is designed to provide a power lift for plows, being provided additionally to the usual hand lift.

For convenience of illustration I have shown only the necessary details of those parts commonly employed and forming no feature of the present invention, such parts being generally referred to as plow beams 1, in each of which there is mounted one terminal as 2 of a crank member 3, hereinafter referred to as the crank axle, the opposite terminal 4 of which forms the axial support for the wheel. Associated with each crank axle is the usual or ordinary lifting lever 5, adapted for manual operation and designed through suitable and well understood shifting of the crank axle to raise or lower either or all of the plow beams as may be desired. It is to be understood that these parts form no material detail of the present invention, and the illustration of such parts is intended to conventionally illustrate any desired construction.

The present improvement is particularly concerned with a means whereby the wheel or wheels in their tractive movement may be utilized as a power to bodily move the crank axle or axles, and hence lift or lower the plow beams. Generally speaking, the construction whereby this result is gained is through the medium of what will be termed a clutch, and the general structure will be hereinafter so designated.

The main member of the clutch, hereinafter referred to as the wheel hub includes an annular casing comprising an outer face plate 6, and an inner face plate 7. The outer face plate is formed beyond the axial line of said member with an opening 8, the wall 9 of which is arranged to provide an extended bearing. The peripheral edge 10 of the outer face plate, is in the form of a flange to provide a roller bearing surface, as will later appear. The inner face plate 7 is substantially similar in size to the outer face plate and is secured to the latter through the medium of a single bolt 11. The face plates thus constitute an annular casing, of hollow formation, which in effect provide the hub of the wheel, the inner face plate having a particularly specific formation to be later described.

The wheel includes an annular hub ring 12 to the outer annular edge of which is secured a plate 13, carrying the inner ends of the spokes 14, which latter at their outer end are connected to the rim or tread portion of the wheel. The hub ring 12 has an interior diameter exceeding the exterior diameter of the hub proper, and is adapted to be arranged in concentric relation to the hub, and to be held in such relation by outer and inner connecting plates 16 and 17 of annular formation. These plates are secured to the hub ring and to each other by bolts 18, the outer plate having its relatively inner edge riding in a recess 20 formed in the face plate 6 of the hub, while the inner plate bears within a projecting portion 21 of the inner face plate 7 of the hub. The inner edge of the inner plate 17 is formed with a series of tooth like projections 22, this plate, by this formation, together with the parts connected with such plate, constituting one of the clutch members.

On the outer surface of the inner plate 7 of the hub, in line with the bearing opening 8 of the outer plate 6, there is formed an opening 23, the outer surface of said inner plate 7 being formed to provide a thickened portion 24, concentric with the opening 23, the annular edge of which thickened portion, as 25, constituting a cam surface, and being interrupted at diametrically opposite points with depressions 26. The part 24, which will be hereinafter referred to as the cam is designed for the automatic release of the clutch, and its operative connection will later appear.

The terminal 4 of the crank axle is arranged within a boxing 27 of usual sleeve like formation, said boxing being formed with longitudinally arranged keys 28, and the walls of the opening 23 in the inner plate 7 of the hub, as well as the bearing wall 9 in the outer plate of the hub, being formed with keyways 29 to receive the keys, whereby the boxing and hub are secured against independent rotative movement. The boxing is of a length to extend beyond the bearing 9, the extended portion being threaded at 30 to receive a nut 31, bearing against the part 9 to prevent endwise movement of the boxing. The extreme inner end of the boxing is annularly enlarged to provide a rib 32 with which are engaged the suitably formed terminals 33 of a two-part bracket 34, which is secured to the crank axle by bolts 35, thus insuring the proper relative positions of the boxing and crank axle.

The inner face of the inner plate 7 of the hub is formed, inwardly of its peripheral edge, with an in-standing concentric flange 36. This flange is interrupted at diametrically opposite points, and extended inwardly on parallel lines at such interrupted points to form guide flanges 37, the said guide flanges providing a space diametrically of the plate, as clearly shown in Fig. 6. A locking bolt 38 is mounted for sliding movement in the space thus provided, the nose 39 of said bolt being of a form best adapted for locking coöperation with the teeth 22, hereinbefore referred to. The bolt is spring moved in an operative direction by a spring 40 connected to the plate 7, and to the bolt, and said bolt is formed with a lateral enlargement 41 formed with a depression 42 to receive the operating dog.

The boxing 27 is formed adjacent its inner end with an annular flange 43, and loosely mounted on the boxing intermediate said flange and the cam 24 is a trip member 44, provided at diametrically opposite points with lugs 45. The trip member has a maximum diametric measurement similar to the maximum diametric measurement of the cam 24, the peripheral surface of the trip member having a diametric extent practically coincident with the diametric measurement between the inner limits of the recesses 26 of the cam, as will be plain from Fig. 3.

A dog is arranged to form a connection between the trip member and locking bolt, said dog comprising a cylindrical stem 46, rotatably supported in a depression 47 formed in a shouldered offset 48 of the flange 43, on which offset the trip member is rotatably mounted, the opening 23 in the cam having a similar depression 49 in its wall to receive the stem. The respective ends of the stems are provided with projections 50 and 51, each having a head 52 at its free terminal. The head of the projection 50 operates in a depression 42 of the locking bolt, while the head of the projection 51 operates in a depression 53 in the wall of the boxing engaging opening for the trip member. The trip member is thus, through the dog, connected to the locking bolt.

Mounted on a web projection 54 from the bracket 34 is a lever 55, the lower end of which is provided with a laterally extending roller 56 of a size to readily seat in one of the depressions 26.

The invention contemplates obvious mechanical expedients for insuring certainty and ease of operation of the parts, for example, I contemplate arranging between the hub member and hub ring, anti-friction devices, as rollers 57, these rollers being positioned between the hub ring and flange of the plate 6 of the hub, and the connecting plates 16 and 17. Furthermore it being understood that, as illustrated, the similar ground wheels are each provided with the clutch connection described, the operating levers 55 may if desired be connected together at their upper ends by a connector 58, and the latter to a single operating member 59 whereby both such levers may be simultaneously operated.

In the normal position of the parts, it will be understood that the roller 56 of a clutch member, is resting within a depression 26 of the cam 24 and is hence in the path and operating as a stop for one of the lugs 45 to thereby hold the trip member in a position to so arrange the dogs that the locking bolt will be held retracted. In this position of the parts the hub remains stationary and the wheel rotates freely about said hub as an axis. Assuming it to be desired to operate the plow lift, the levers 55 are moved on their pivotal supports so as to swing the roller terminals 56 out of the depressions 26 of the cam 24 and hence out of the path of the lugs of the trip members. The spring 40 immediately operates to move the locking bolts into coöperation with the teeth 22, locking the hub member and hub ring together. The entire structure now rotates, and as the crank axle is mounted eccentrically with relation to the axis of the wheel, said crank axle is moved to a new position. This movement of the crank axle continues until the roller 56 of the lever, which during such movement has been riding on the peripheral edge of the cam 24, rides into the opposing recess 26, and is engaged by the opposing lug 45 of the trip member. The stopping of the trip member causes a slight rotative movement thereof with the effect to withdraw the locking bolt from the teeth 22, through movement of the dog, and again free the hub member from the hub ring.

As arranged the clutch member is adapted for automatic release when the parts have reached a diametrically opposite position from that of their engagement, hence the plow lift is adapted to actuate the plow beams from one extreme position to the other, raising them to their limit, or permitting them to lower to their limit, the operation and control of the parts being identical in both the raising and lowering operation.

What is claimed as new is:—

1. A power lift comprising a tractive wheel, a hub therefor movable independently thereof, a lifting axle eccentrically mounted in said hub, clutch mechanism coöperating with the hub and wheel to interlock the same, and means for controlling the clutch mechanism.

2. A power lift for plows and the like including a ground wheel, a free hub therefor, a crank axle eccentrically mounted in the hub and adapted to be connected to a plow beam, clutch mechanism coöperating with the hub and wheel, a trip member controlling said clutch mechanism, and manually operable means for governing the trip member.

3. A clutch mechanism for power lifts including a wheel, a free hub member therefor, a lifting element eccentrically arranged in the hub member, a locking bolt carried by the hub, the wheel being formed with teeth to be engaged by said bolt, a trip member mounted for free rotation on the hub, a dog connecting the trip member and locking bolt, and means for manually controlling the free rotation of the trip member.

4. A clutch mechanism for power lifts for wheel plows including a free wheel hub, a locking bolt arranged within said hub, the wheel proper being formed with teeth to coöperate with said bolt, a lifting member eccentrically mounted in the hub, a trip member mounted for free rotation, an operating dog connected with the trip member and with the bolt, a manually operable lever, and a cam formed on the hub to control the position of the lever with respect to the trip member.

5. A power lift for wheel vehicles including a traction wheel, a free hub therefor, a lifting member mounted eccentrically in the hub, interlocking elements carried by the hub and wheel proper, a trip member mounted for free rotation with respect to the hub, lugs projecting from said member, a connection between said member and one of the interlocking elements, a manually operable lever, and a cam formed to hold said lever beyond the path of the lugs of the trip member throughout a predetermined portion of the movement of said cam.

6. A power lift for wheel vehicles including a traction wheel, a free hub therefor, a lifting member mounted eccentrically in the hub, interlocking elements carried by the hub and wheel proper, a trip member mounted for free rotation with respect to the hub, lugs projecting from said member, a connection between said member and one of the interlocking elements, a manually operable lever, and a cam formed to hold said lever beyond the path of the lugs and the trip member throughout a predetermined portion of the movement of said cam, said cam being formed with depressions to permit the lever to ride in the path of the lugs.

7. A power lift for wheel plows including a wheel hub free of the wheel proper and comprising spaced face plates, a boxing eccentrically mounted and held in said hub, a crank axle adapted to be connected with a plow beam and with the boxing, a locking bolt mounted between the plates of the hub, a spring for operating the bolt in one direction, teeth on the wheel arranged to coöperate with the locking bolt, a trip member rotatably mounted on the boxing and formed with lugs, a dog operatively connected with the trip member and with the locking bolt, and a manually operable lever acting in coöperation with one of the lugs of the trip member to hold the locking bolt withdrawn from the teeth.

8. A power lift for wheel plows including a wheel hub free of the wheel proper and comprising spaced face plates, a boxing eccentrically mounted and held in said hub, a crank axle adapted to be connected with a plow beam and with the boxing, a locking bolt mounted between the plates of the hub, a spring for operating the bolt in one direction, teeth on the wheel arranged to coöperate with the locking bolt, a trip member rotatably mounted on the boxing and formed with lugs, a dog operatively connected with the trip member and with the locking bolt, and a manually operable lever acting in coöperation with one of the lugs of the trip member to hold the locking bolt withdrawn from the teeth, and a cam carried by the hub to govern the position of the lever with respect to the lugs of the trip member.

9. A power lift for wheel plows including a wheel hub free of the wheel proper and comprising spaced face plates, a boxing eccentrically mounted and held in said hub, a crank axle adapted to be connected with a plow beam and with the boxing, a locking bolt mounted between the plates of the hub, a spring for operating the bolt in one direction, teeth on the wheel arranged to coöperate with the locking bolt, a trip member rotatably mounted on the boxing and formed with lugs, a dog operatively connected with the trip member and with the locking bolt, and a manually operable lever acting in coöperation with one of the lugs of the trip member to hold the locking bolt withdrawn from the teeth, and a cam having an operative face to hold the lever beyond the path of movement of the lugs of the trip member and formed with depressions to permit said lever to ride into position to engage said lugs and form a stop for the trip member.

In testimony whereof I affix my signature in presence of two witnesses

GEORGE A. KNOBLOCK.

Witnesses:
GEORGE J. OLTSCH,
ADOLPH S. GUIZ.